(12) United States Patent
Farag et al.

(10) Patent No.: US 12,728,872 B2
(45) Date of Patent: Sep. 8, 2026

(54) METHOD FOR IMPROVING THE AVAILABILITY OF AN ENERGY STORAGE OR TRANSFORMATION SYSTEM

(71) Applicant: VOLVO TRUCK CORPORATION, Gothenburg (SE)

(72) Inventors: Bassem Farag, Gothenburg (SE); Mark Hirche, Hisings Kärra (SE); Faisal Altaf, Västra Frölunda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 197 days.

(21) Appl. No.: 17/659,739

(22) Filed: Apr. 19, 2022

(65) Prior Publication Data

US 2022/0340150 A1 Oct. 27, 2022

(30) Foreign Application Priority Data

Apr. 23, 2021 (EP) .................................... 21170156

(51) Int. Cl.
*B60W 50/029* (2012.01)
*B60R 16/023* (2006.01)
(Continued)

(52) U.S. Cl.
CPC ....... *B60W 50/029* (2013.01); *B60R 16/0232* (2013.01); *B60W 50/0205* (2013.01); *G07C 5/0808* (2013.01)

(58) Field of Classification Search
CPC ............ B60W 50/029; B60W 50/0205; B60R 16/0232; G07C 5/0808; B60L 58/10;
(Continued)

(56) References Cited

U.S. PATENT DOCUMENTS 6,389,350 B1 5/2002 Fennel
7,173,396 B2 2/2007 Gunji
(Continued)

FOREIGN PATENT DOCUMENTS

CN 104509128 A 4/2015
CN 105453141 A 3/2016
(Continued)

OTHER PUBLICATIONS

Notice of Allowance dated Aug. 15, 2024 in corresponding U.S. Appl. No. 17/659,745, 5 pages.
(Continued)

*Primary Examiner* — Rachid Bendidi
*Assistant Examiner* — Kai Wang
(74) *Attorney, Agent, or Firm* — Jeffri A. Kaminski; Venable LLP

(57) ABSTRACT

A method for improving the availability of an energy storage or transformation, EST, system of a vehicle is described. The method comprises transferring the EST condition data from the first electronic unit by means of a second data transfer mode, receiving a fault or error regarding the EST condition data in relation to the first data transfer mode, determining whether or not an EST system criterium is achieved, the EST system criterium comprising at least that the EST condition data transferred by the first electronic unit by means of the second data transfer mode is received by the second electronic unit, in response of achieving the EST system criterium, operating the EST system despite the fault or error and using the EST condition data transferred by means of the second data transfer mode.

14 Claims, 4 Drawing Sheets

(51) Int. Cl.
*B60W 50/02* (2012.01)
*G07C 5/08* (2006.01)

(58) Field of Classification Search
CPC .......... B60L 58/13; B60L 58/16; B60L 58/24; B60L 58/30; B60L 3/12; B60L 3/0046; B60L 3/0023; B60L 3/0053; B60L 58/12
See application file for complete search history.

(56) References Cited

U.S. PATENT DOCUMENTS

| | | | |
|---|---|---|---|
| 9,171,407 B2 * | 10/2015 | Kang | B60W 20/50 |
| 9,233,610 B2 * | 1/2016 | Kim | B60L 3/108 |
| 9,707,855 B1 | 7/2017 | Wang et al. | |
| 10,151,801 B2 * | 12/2018 | Gelso | B60L 58/22 |
| 10,516,683 B2 * | 12/2019 | Conner | H04L 63/1425 |
| 11,476,676 B1 | 10/2022 | Lohe et al. | |
| 2010/0066526 A1 | 3/2010 | Kascha | |
| 2011/0202215 A1 | 8/2011 | Falkenstein et al. | |
| 2012/0139503 A1 * | 6/2012 | Saeki | G03B 7/26 320/162 |
| 2012/0242144 A1 * | 9/2012 | Chorian | H01M 50/583 429/62 |
| 2013/0338872 A1 | 12/2013 | Niemann et al. | |
| 2014/0175874 A1 * | 6/2014 | Stimm | B60L 58/10 307/10.7 |
| 2014/0199569 A1 | 7/2014 | Sisk | |
| 2015/0151694 A1 | 6/2015 | Kornhaas | |
| 2015/0231985 A1 | 8/2015 | Li | |
| 2015/0231986 A1 | 8/2015 | Li | |
| 2016/0020496 A1 * | 1/2016 | Burrows | B60L 15/20 429/62 |
| 2016/0355198 A1 * | 12/2016 | Dulmage | B61L 15/0072 |
| 2018/0234446 A1 | 8/2018 | Conner et al. | |
| 2019/0034256 A1 | 1/2019 | Fox | |
| 2020/0156475 A1 * | 5/2020 | Rahbari Asr | G08B 29/06 |
| 2020/0180603 A1 * | 6/2020 | Kim | B60L 1/003 |
| 2021/0265670 A1 * | 8/2021 | Choi | H04L 43/0817 |
| 2022/0155381 A1 * | 5/2022 | Jo | G01R 31/367 |

FOREIGN PATENT DOCUMENTS

| | | | | |
|---|---|---|---|---|
| CN | 106997970 A | 8/2017 | | |
| CN | 212257606 U | 12/2020 | | |
| DE | 102008040400 A1 | 1/2010 | | |
| DE | 102010045514 A1 | 3/2012 | | |
| DE | 102010062484 A1 | 6/2012 | | |
| DE | 102010045514 B4 | * | 3/2018 | B60L 3/0092 |
| EP | 3512061 A1 | 7/2019 | | |
| JP | 2012050156 A | 3/2012 | | |
| JP | 6344302 B2 | * | 6/2018 | |
| WO | 2010118039 A1 | 10/2010 | | |
| WO | 2020037220 A1 | 2/2020 | | |

OTHER PUBLICATIONS

European Communication dated Sep. 28, 2022 in corresponding European Patent Application No. 2216944.6, 9 pages.
European Communication dated Sep. 21, 2022 in corresponding European Patent Application No. 22169442.5, 26 pages.
Chinese Office Action dated Jan. 26, 2025 in corresponding Chines Patent Application No. 202210415622.5, 20 pages.
Non-Final Office Action dated Apr. 15, 2024 in corresponding U.S. Appl. No. 17/659,745, 20 pages.
European Search Report dated Oct. 18, 2021 in corresponding European Patent Application No. 21170156.0, 8 pages.
European Search Report dated Oct. 20, 2021 in corresponding European Patent Application No. 21170150.3, 8 pages.
European Communication pursuant to Article 94(3) EPC dated May 27, 2026 in corresponding European Patent Application No. 22169442.5, 8 pages.

* cited by examiner

METHOD FOR IMPROVING THE AVAILABILITY OF AN ENERGY STORAGE OR TRANSFORMATION SYSTEM

TECHNICAL FIELD

The present invention relates to a method for improving the availability of an energy storage or transformation system of a vehicle, an energy storage or transformation management system, an energy storage or transformation system, and to a vehicle.

BACKGROUND

A vehicle typically comprises an engine for propelling the vehicle. The engine may be an internal combustion engine powered by e.g. liquid or gaseous fuel, or it may be an electric machine powered by electricity. Moreover, hybrid solutions exist in which e.g. the vehicle is propelled both by an internal combustion engine and an electric machine. In either way, an energy storage device is used to store the energy needed in order to propel the vehicle. For an electric machine, the energy storage devices may be batteries or supercapacitors, or, in case the vehicle is equipped with a fuel-cell system, the fuel cells being energy transformation devices, the energy storage devices are hydrogen containing storages. The energy storage device and the energy transformation devices may commonly be referred to as energy storage or transformation devices, and the system to which they belong may be referred to as an energy storage or transformation system.

Vehicles are thus in need of the energy storage or transformation system for providing propulsion power for traction. In certain situations, the propulsion power is particularly needed, e.g. when a vehicle is subject to a potentially hazardous situation, like passing a railway crossing, for which a sufficient propulsion power is required to get out of the hazardous situation. Thus, the readiness of propulsion power and the availability of the energy storage or transformation system are important to keep as high as possible. For internal combustion engine vehicles, a high availability of propulsion power is based on concepts where in case of e.g. a restart of an ECU, the ECU synchronizes itself to the still ongoing combustion process. Compared to internal combustion engine vehicles, electric vehicles are facing other challenges and uncertainties regarding e.g. electric range, drivability, power availability, and remaining-useful-life of vehicles mainly due to complex electrochemical, thermal, and ageing dynamics of the energy storage or transformation devices. Also safety hazards like short-circuit, explosion in case of vehicle crash, thermal runway, etc are important to supervise. Therefore, the energy storage or transformation system of an electric vehicle requires advanced monitoring, control, and fault diagnostics to manage all these robustness and safety issues. In spite of such advanced monitoring, a fault or error may lead to problematic problems of the energy storage or transformation system, such as e.g. an at least temporary lack of operability of the energy storage or transformation system. Thus, there is a drive in the industry for an improved availability of the energy storage and transformation system.

SUMMARY

It is an object of the present invention to at least partly alleviate the shortcomings discussed above in relation to known energy storage or transformation systems, and to improve the availability of the energy storage or transformation systems.

According to at least a first aspect of the present invention, a method for improving the availability of an energy storage or transformation, EST, system of a vehicle is provided. The EST system comprises a first electronic unit configured to provide EST condition data and a second electronic unit configured to receive the EST condition data from the first electronic unit by means of a first data transfer mode. The method comprises:

- transferring the EST condition data from the first electronic unit by means of a second data transfer mode,
- receiving a fault or error regarding the EST condition data in relation to the first data transfer mode,
- determining whether or not an EST system criterium is achieved, the EST system criterium comprising at least that the EST condition data transferred by the first electronic unit by means of the second data transfer mode is received by the second electronic unit,
- in response of achieving the EST system criterium, operating the EST system despite the fault or error and using the EST condition data transferred by means of the second data transfer mode.

Hereby, the EST system may be operated based on the EST condition data from the second data transfer mode even though a fault or error is present in the EST condition data of the first data transfer mode. Thus, the availability of the EST system is improved. Moreover, potential undesired, or even hazardous, vehicle conditions or vehicle situations which otherwise could be the result of the fault or error, can be avoided, as the fault or error of the EST condition data in relation to the first data transfer mode is circumvented with the transfer of the EST condition data by means of the second data transfer mode. Stated differently, the EST system is kept in an operable condition despite the fault or error regarding the EST condition data in relation to the first data transfer mode.

As will be described in further detail later, but which is briefly mentioned here, the EST condition data may be condition data of a component (i.e. a component condition parameter), measured data from e.g. a sensor (which measure quantities like e.g. current, voltage, temperature, pressure, gassing, stress etc inside EST system), actuation signal data for an actuator, or data of an estimated or calculated internal state of the EST system, such as e.g. state of charge (SoC) or state of power (SoP) of a battery, a battery cell or a block of battery cells (such as a battery pack). Stated differently, the fault or error of regarding the EST condition data in relation to the first data transfer mode may comprise both fault diagnostic of components (e.g. fault in a sensor) and diagnostics of measurement and calculations errors (e.g. erroneous calculations of an internal state of the EST system, e.g. of the SoC or SoP). Correspondingly, the fault or error may origin from EST condition data of a component, measured data from e.g. a sensor, actuation signal data from an actuator (e.g. a contactor or a relay) or a calculated internal state of the EST system. Moreover, the fault or error may be related to the first data transfer mode, and not a fault or error in the EST condition data per se, as will be described later. The EST condition data may be described as being at least partly included in the characterization of the condition of the EST system. The EST condition data may be referred to as condition data of the EST system.

According to at least one example embodiment, the energy storage or transformation, EST, system is an energy storage system, such as e.g. a battery system comprising a plurality of EST devices in the form of battery packs or batteries. According to at least one example embodiment, the EST system is an energy transformation system, such as e.g. a fuel cell system comprising a plurality of EST devices in the form of fuel cells.

The EST system criterium may be one of several EST system criteria described in further detail later. Thus, the EST system criterium may be an EST system criteria comprising a combination of several criteria of which all need to be achieved in order to operate the EST system despite the fault or error regarding the EST condition data in relation to the first data transfer mode. The EST system criterium may be referred to as a safety criterium or a vehicle criterium or a first criterium. As an alternative to the EST system criterium, the method may comprise the step of identifying an event belonging to a predetermined group of events, wherein at least one such event is that the EST condition data transferred by the first electronic unit by means of the second data transfer mode is received by the second electronic unit, and wherein the method comprises the step of in response of identifying such event, operating the EST system despite the fault or error and using the EST condition data transferred by means of the second data transfer mode.

According to at least one example embodiment, the step of receiving a fault or error regarding the EST condition data in relation to the first data transfer mode may comprise identifying a fault or error regarding the EST condition data in relation to the first data transfer mode.

According to at least one example embodiment, the method comprises:

transferring the EST condition data from the first electronic unit by means of the first data transfer mode.

Thus, at least prior to receiving the fault or error, the EST condition data may be transferred from the first electronic unit by means of the first and second data transfer modes.

According to at least one example embodiment, the first data transfer mode comprises transferring the EST condition data via a first communication bus, and the second data transfer mode comprises transferring the EST condition data via a second communication bus being different to the first communication bus.

Hereby, the EST condition data may be transferred via two different communication buses, and thus, redundancy of EST condition data is provided in a simple yet effective manner. The first communication bus may e.g. extend from the first electronic unit to the second electronic unit, or extend along at least a sub-part from the first electronic unit to the second electronic unit. Correspondingly, the second communication bus may e.g. extend from the first electronic unit to the second electronic unit, or extend along at least a different sub-part from the first electronic unit to the second electronic unit. According to at least one example embodiment, the first communication bus is parallel to the second communication bus. The first communication bus is typically physically separated from the second communication bus. Stated differently, the first and second communication buses are difference communication lines. Thus, the first communication bus may be referred to a first communication line, and the second communication bus may be referred to a second communication line, different to the first communication line.

According to at least one example embodiment, the first data transfer mode comprises transferring the EST condition data via a first message, and the second data transfer mode comprises transferring the EST condition data via a second message being different to the first message.

Hereby, redundancy of EST condition data is provided by means of different messages. For example, the EST condition data may be transferred via the first message at a first instance in time, and then then EST condition data may be transferred via the second message at a second instance in time, different to the first instance. Thus, the second message may simply be a message of the same type as the first message but transferred at different point in time. The first message may be referred to as a first data message, and the second message may be referred to as a second data message.

According to at least one example embodiment, the second message is of a different type than the first message, or the data representing the EST condition data in the second message is of a different type than the data representing the EST condition data in the first message.

Thus, the second message may be, or comprise, a message of another type as the first message, e.g. by using another protocol, or another data protocol, or other type of data. For example, the first message may comprise the EST condition data as data in the unit power, while the second message may comprise the EST condition data as corresponding data but in the units current and voltage. As the product of the current and voltage is equal to the power for corresponding data, the first and the second messages comprise different data representing the EST condition data. According to at least one example embodiment, the first data transfer mode comprises transferring the EST condition data via a first data protocol, and the second data transfer mode comprises transferring the EST condition data via a second data protocol being different to the first data protocol.

According to at least one example embodiment, the first data transfer mode comprises transferring the EST condition data via the first message and the first communication bus, and the second data transfer mode comprises transferring the EST condition data via the second message and the second communication bus.

Hereby, the redundancy of the EST condition data can be further improved. For example, the second message transferred via the second communication bus may be of different type than the first message, or the data representing the EST condition data in the second message may be of a different type than the data representing the EST condition data in the first message, as earlier described.

According to at least one example embodiment, the EST system criterium comprises that the fault or error regarding the EST condition data in relation to the first data transfer mode is expressive of an at least temporary lack of operability of the EST system.

Thus, the step of operating the EST system despite the fault or error regarding the EST condition data in relation to the first data transfer mode by using the EST condition data transferred by means of the second data transfer mode, may be performed in response to that the fault or error is expressive of an at least temporary lack of operability of the EST system. That is, the fault or error would lead to an at least temporary lack of operability of the EST system, such as e.g. an at least temporary power loss, if not the EST condition data transferred by means of the second data transfer mode would be used. Hereby, an at least temporary lack of operability of the EST system, potentially leading to an hazardous vehicle condition or an hazardous vehicle situation, which otherwise could be the result of the fault or error can be avoided, as the EST condition data transferred by means of the second data transfer mode is used instead of the EST condition data transferred by means of the first data transfer mode.

Thus, with regards to the previously described EST system criteria, the EST system criteria may comprise a first EST system criterium defined as that the EST condition data transferred by the first electronic unit by means of the second data transfer mode is received by the second electronic unit, and a second EST system criterium defined as that the fault or error regarding the EST condition data in relation to the first data transfer mode is expressive of an at least temporary lack of operability of the EST system. Thus, according to such embodiment, both the first and second EST system criterium. Related to the alternative embodiments of identifying an event from a group of predefined events, one such event may be that the fault or error regarding the EST condition data in relation to the first data transfer mode is expressive of an at least temporary lack of operability of the EST system, and thus, in response of identifying such event, operating the EST system despite the fault or error and using the EST condition data transferred by means of the second data transfer mode.

According to at least one example embodiment, in which the EST system is a battery system, the EST system criterium comprises a fault or error expressive of an at least temporary lack of power of the battery system. That is, the fault or error regarding the EST condition data in relation to the first data transfer mode is a fault or error which would otherwise cause a lack of power of the battery system (e.g. a fault which would cause the battery system to at least temporarily shut down), if not the EST condition data by means of the second transfer mode would be available. Thus, for embodiments in which the EST system is a battery system, the temporary lack of operability may be a temporary lack of power.

According to at least one example embodiment, the EST system criterium, or EST system criteria, comprises determining that the EST system can be operated in a safe and robust manner despite the fault or error regarding the EST condition data in relation to the first data transfer mode. Thus, despite the fault or error regarding the EST condition data in relation to the first data transfer mode, the EST system criterium or EST system criteria may provide a safeguard that the EST system may be operated based on the EST condition data transferred by means of the second data transfer mode in a safe and robust manner.

According to at least one example embodiment, the method comprises:

identifying a vehicle situation which, in case of an at least temporary lack of operability of the EST system, belong to a predetermined group of vehicle situations defined as hazardous, and wherein the step of operating the EST system despite the fault or error and using the EST condition data transferred by means of the second data transfer mode is carried out in response to identifying the vehicle situation belonging to the predetermined group of vehicle situations defined as hazardous.

Thus, according to such embodiment, in response of achieving the EST system criterium and in response to identifying the vehicle situation belonging to the predetermined group of vehicle situations defined as hazardous, the step of operating the EST system despite the fault or error and using the EST condition data transferred by means of the second data transfer mode is carried out. That is, the fault or error regarding the EST condition data in relation to the first data transfer mode would lead to a potentially harmful situation, e.g. a hazardous or dangerous vehicle situation, if not the EST condition data transferred by means of the second data transfer mode would be used in order to be able to operate the EST system despite the fault or error. Hereby the hazardous vehicle situations can be avoided. Thus, based on identifying a vehicle situation belonging to a vehicle situation defined as hazardous, the method comprises operating the EST system despite the fault or error regarding the EST condition data in relation to the first data transfer mode. For example, in case the vehicle is positioned at a railway crossing in risk of being hit by the train, the vehicle situation is identified as, in case of an at least temporary lack of operability of the EST system (e.g. as the previously exemplified lack of power for the battery system), hazardous (e.g. leading to a potentially harmful situation). Thus, if the EST system criterium is achieved, and that the vehicle situation is identified as belonging to the predetermined group of vehicle situations defined as hazardous, the EST system may be operated despite the fault or error regarding the EST condition data in relation to the first data transfer mode by using the EST condition data transferred by means of the second data transfer mode. Hereby, the vehicle can at least pass the railway crossing in a safe manner. After passing the railway crossing, the vehicle situation may no longer be identified as belonging to the predetermined group of vehicle situations defined as hazardous (i.e. not leading to a potentially harmful situation).

According to at least one alternative embodiment, the EST system criterium or EST system criteria may comprise the step of identifying a vehicle situation which, in case of an at least temporary lack of operability of the EST system, belong to a predetermined group of vehicle situations defined as hazardous.

According to at least one example embodiment, the predetermined group of vehicle situations defined as hazardous comprises vehicle situations potentially resulting in personal injuries. For example, the predetermined group of vehicle situations defined as hazardous results in a potentially harmful situations. Thus, the potentially harmful situations previously mentioned may be defined as resulting in personal injuries, or potentially resulting in personal injuries. According to at least one example embodiment, the predetermined group of vehicle situations defined as hazardous comprises vehicle situations resulting in personal injuries.

According to at least one example embodiment, the fault or error regarding the EST condition data in relation to the first data transfer mode is expressive of an at least temporary lack of operability of the EST system if the fault or error results in an at least temporary lack of operability for an identified vehicle situation which does not belong to the predetermined group of vehicle situations defined as hazardous.

Thus, the fault or error regarding the EST condition data in relation to the first data transfer mode is of such a degree that the same fault or error would result in an at least temporary lack of operability of the EST system if the identified vehicle situation does not belong to the predetermined group of vehicle situations defined as hazardous. Such fault or error may thus be referred to as being expressive of an at least temporarily lack of operability of the EST system.

The predetermined group of vehicle situations defined as hazardous may comprise, or may be defined by, ISO 26262 (titled "Road vehicles—Functional safety"). For example, the predetermined group of vehicle situations defined as hazardous may be determined by the Hazard Analysis and Risk Assessment, HARA, according to ISO 26262. Typically, the HARA includes the ASIL Assessment Process, and the Severity classifications (S0-S3). Moreover, the HARA may include the Exposure Classifications (E0-E4) and/or Controllability classifications (C0-C3). For example, the vehicle situation may be considered hazardous by the Severity classification of at least S1, or at least S2 (or S3).

According to at least one example embodiment, the EST system criterium is based on vehicle functional safety or safety-critical functionality, such as e.g. the previously mentioned ISO 26262 and HARA. That is, the EST system criterium or EST system criteria may comprise vehicle functional safety or safety-critical functionality, and the EST system may be operated despite the fault or error regarding the EST condition data in relation to the first data transfer mode in order to ensure vehicle functional safety or safety-critical functionality.

According to at least one example embodiment, the method comprises, in response of identifying a vehicle situation which, in case of an at least temporary lack of operability of the EST system, does not belong to the predetermined group of vehicle situations defined as hazardous, enabling or allowing the EST system to at least temporary lack operability, e.g. to be at least temporarily shut down, in response to the fault or error.

According to at least one example embodiment, the method comprises, in response of not achieving the EST system criterium or EST system criteria, enabling or allowing the EST system to at least temporary lack operability, e.g. to be at least temporarily shut down, in response to the fault or error regarding the EST condition data in relation to the first data transfer mode. That is, if not the EST system criterium is achieved, and the fault or error is expressive of an at least temporary lack of operability of the EST system, the EST system may act in response to such fault or error and enable the EST system to at least temporarily shut down.

According to at least one example embodiment, the vehicle situation (or vehicle condition), in case of at least temporary lack of operability of the EST system, is defined as hazardous or leading to a potentially harmful situation if the expected result of the at least temporary lack of operability of the EST system is more hazardous than that of the fault or error regarding the EST condition data in relation to the first data transfer mode.

According to at least one example embodiment, the identified vehicle situation belonging to the predetermined group of vehicle situations defined as hazardous has a predetermined vehicle risk level, and the received fault or error regarding the EST condition data in relation to the first data transfer mode has a predetermined EST system risk level, wherein the step of operating the EST system despite the fault or error and using the EST condition data transferred by means of the second data transfer mode is performed in response to that the risk level of the identified vehicle situation is higher than the risk level of the EST system.

The predetermined risk level may be determined in accordance with the previously described ISO 26262. Typically, the risk level is based on the ASIL Assessment Process, and the Severity classifications (S0-S3) and possibly the Exposure Classifications (E0-E4) and/or Controllability classifications (C0-C3).

That is, the fault or error regarding the EST condition data in relation to the first data transfer mode may be rationalized with regards to the hazardous vehicle situation. Stated differently, the fault or error may be rationalized with regards to the potentially harmful situation being a result of the fault or error regarding the EST condition data in relation to the first data transfer mode. According to at least one example embodiment, the EST system criterium may consider such potentially harmful situation to infer about severity of the fault or error.

The vehicle situation may be defined differently to a vehicle condition, the vehicle condition typically comprises a vehicle state and/or the vehicle situation (or vehicle driving situation). Thus, a potentially harmful situation may be the result of a dangerous state of the vehicle, e.g. thermal runway, or may be the result of a dangerous driving situation, e.g. a railroad crossing. The predetermined group of vehicle situations defined as hazardous may e.g. only include the latter.

According to at least one example embodiment, the fault or error regarding the EST condition data in relation to the first data transfer mode is one of the following: transmission error of the EST condition data, repetition of the EST condition data, deletion of the EST condition data, corruption of the EST condition data, delay of the EST condition data and masquerade error of the EST condition data.

Thus, alternatively, or in addition to, that the fault or error is related to the EST condition data per se, the fault or error may be related to the data transfer mode of the EST condition data. Corruption of the EST condition data may e.g. also include insertion of data, i.e. additional message which is interpreted to have correct payload, or re-sequencing of data, i.e. gateway messages in the wrong order.

According to at least one example embodiment, the EST condition data is subject to a communication protection measure to achieve data integrity.

Hereby, undesired use or access to the EST condition data may be prevented.

According to at least one example embodiment, the first electronic unit comprises a first sensor configured to provide measurement data as the EST condition data, and wherein receiving a fault or error regarding the EST condition data in relation to the first data transfer mode is based on a fault or error regarding the measurement data in relation to the first data transfer mode Hereby, the EST system may be operated using the measurement data transferred by means of the second data transfer mode even though a fault or error regarding the measurement data in relation to the first data transfer mode is present. Thus, the availability of the EST system may be improved. That is, in case of a sensor failure resulting in a fault or error in the measured parameter, or the data transfer thereof by means of the first data transfer mode, measurement transferred by means of the second data transfer mode may be used instead.

According to at least one example embodiment, the first electronic unit comprises a calculation unit configured to provide a calculation of a first internal state of the EST system as the EST condition data, and wherein receiving a fault or error regarding the EST condition data in relation to the first data transfer mode is based on a fault or error regarding the first internal state in relation to the first data transfer mode.

Hereby, the EST system may be operated using the calculation or estimation of the first internal state transferred by means of the second data transfer mode even though a fault or error regarding the first internal state in relation to the first data transfer mode is present. Thus, the availability of the EST system may be improved. That is, in case of a sensor failure, or failure of the calculation unit, resulting in a fault or error in the calculation or estimation of the first internal state, or the data transfer thereof by means of the first data transfer mode, the calculation or estimation of the first internal state transferred by means of the second data transfer mode may be used instead.

According to at least one example embodiment, the first internal state of the EST system is at least one of the following, State-of-Charge (SoC), State-of-Power (SoP) and State-of-Energy (SoE).

According to at least one example embodiment, first internal state of the EST system is determined based on the sensory measurement data. Thus, the first internal state, such as e.g. SoC or SoP or SoE, of the EST system can be determined based on data from the sensors of the EST system. For example, the first internal state previously described may be comprised in, and thus constitutes one of, the internal states of the EST system. SoC, SoP and SoE are generally known to the skilled person. For example SoP of a battery system may be determined using a single battery model for each battery pack "i", as described in patent application PCT/EP2020/066919.

According to at least one example embodiment, the EST system criterium comprises determining that an indicative parameter for the first internal state indicates that there is no fault or error in the calculation or estimation of the first internal state. Hereby, it is more likely that the fault or error originates from the calculation, or calculation unit performing the calculation, than an actual underlying fault or error of the first internal state. Thus, in case the EST condition data in the form of the calculation of the first internal state is transferred by means of the first data transfer mode, and a fault or error is received in regarding the first internal state in relation to the first data transfer mode, the indicative parameter(s), being EST condition data in the form of the calculation of the first internal state but of another type (i.e. the underlying parameters used for determining the first internal state) may be transferred by means of the second data transfer mode. For example, if a SoP estimations for a battery or battery cell is indicated as very low then the indicated parameters, such as the current and voltage can be used to verify if such low SoP is actually the case, or if it is more likely that the fault or error originates from the calculation or estimation, or calculation unit performing the calculation.

According to at least one example embodiment, the first electronic unit comprises one or more sensors connected to the calculation unit, for performing the calculation of the first internal state.

According to at least one example embodiment, the second electronic unit is a control unit, such as a central control unit of the vehicle, or a vehicle ECU.

According to at least one example embodiment, the EST condition data is a calculation of a first internal state in the EST system and the fault or error is determined by comparing the calculation of the first internal state with a threshold value.

Hereby, a simple yet effective means for determining a fault or error in the calculation of the internal state per se is provided. Hereby, the faults or errors may be classified in terms of their significance. If the fault or error is within a certain limit, e.g. below the threshold value, it is classified as normal function behaviour, and no further concern is given to the fault or error (i.e. the fault or error is considered in void). On the other hand, if the fault or error is outside of said limit, e.g. above the threshold value, it is classified as an actual fault or error, and dealt with as previously described.

According to at least one example embodiment, the fault or error may be subject to a residual analysis. That is, analyzing the statistical or stochastic properties of estimation error and subsequently comparing it with the expected probability distribution of such faults or error under given operating conditions. If the error or fault lies outside the boundaries of an expected probability distribution, it can be treated as an outlier. To ensure availability of safety-critical functionality and robustness under potentially harmful situations (e.g. in a vehicle situation belonging to the group of predefined vehicle situations defined as hazardous), the method may detect such large errors (i.e. outliers) and isolate them using stochastic thresholds.

According to at least one example embodiment, the first electronic unit may be simply referred to as the first unit, the second electronic unit may be simply referred to as the second unit, the EST condition data may be simply referred to as the condition data, and the EST system criterium may be simply referred to as a first criteria or a first criterium.

According to a second aspect of the present invention, an EST management system comprising an electronic control unit being configured to perform the method according to the first aspect of the invention is provided. The EST management system may e.g. be a battery management system.

According to a third aspect of the present invention, a computer program is provided. The computer program comprises program code means for performing the method of the first aspect of the invention, when the program is run on a computer.

Such computer program may e.g. be implemented in an electronic control unit, ECU, of the vehicle.

According to a fourth aspect of the present invention, a computer readable medium carrying a computer program comprising program code means for performing the method of the first aspect of the invention, when the computer program is run on a computer, is provided.

According to a fifth aspect of the present invention, an EST system of a vehicle comprising the EST management system according to the second aspect of the present invention is provided. Alternatively, the EST system of the vehicle may comprise the computer program according to the third aspect, or the computer readable medium according to the fourth aspect.

According to at least one example embodiment, the EST system comprises the first electronic unit configured to provide EST condition data, wherein the electronic control unit of the EST management system is configured to receive the EST condition data from the first electronic unit by means of a first data transfer mode, wherein the EST system comprises a first communication bus for transferring the EST condition data by means of the first data transfer mode, and a second communication bus for transferring the EST condition data by means of the second data transfer mode, the second communication bus being different to the first communication bus.

According to a sixth aspect of the present invention, a vehicle comprising an EST system according to the fifth aspect of the present invention is provided. The vehicle is e.g. an electric vehicle powered by electricity from energy storage or transformation devices, such as batteries or fuel cells.

According to a seventh aspect of the present invention, a method for improving the availability of an energy storage or transformation, EST, system of a vehicle, the EST system comprising a first unit configured to provide condition data and a second unit configured to receive the condition data from the first unit by means of a first data transfer mode, is provided. The method comprises:

transferring the condition data from the first unit by means of a second data transfer mode, receiving a fault or error regarding the condition data in relation to the first data transfer mode, determining whether or not a first criteria of the vehicle is achieved, the first criteria comprising at least that the condition data transferred by the first unit by means of the second data transfer mode is received by the second unit, in response of achieving the first criteria, operating the EST system despite the fault or error and using the condition data transferred by means of the second data transfer mode.

Thus, the first electronic unit of the first to sixth aspects of the invention may be simply referred to as the first unit, the second electronic unit of the first to sixth aspects of the invention may be simply referred to as the second unit, the EST condition data of the first to sixth aspects of the invention may be simply referred to as the condition data, and the EST system criterium of the first to sixth aspects of the invention may be simply referred to as a first criteria or a first criterium.

Effects and features of the second to seventh aspects of the invention are largely analogous to those described above in connection with the first aspect of the invention. Embodiments mentioned in relation to the first aspect of the invention are largely compatible with the second to sixth aspects of the invention.

Further advantages and features of the present disclosure are disclosed and discussed in the following description and the accompanying drawings.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
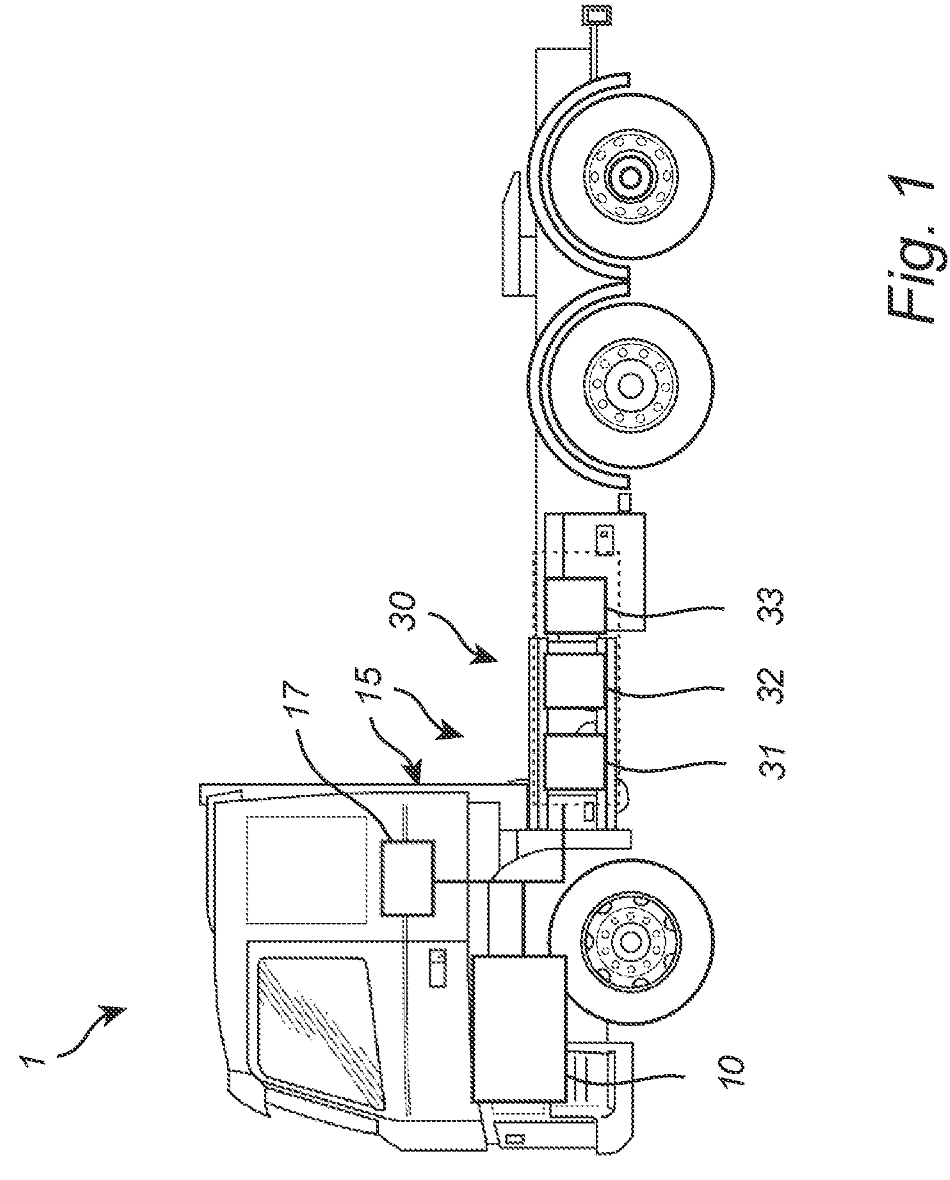
FIG. 1 is a side schematic view of a vehicle in accordance with an example embodiment of the invention.

With reference to FIG. 1, a vehicle 1, here embodied as a heavy duty truck 1, is disclosed for which a method, an energy storage or transformation (EST) system 30, and/or an EST management system 15 of a kind disclosed in the present invention is advantageous. However, the method, the EST system 30 or EST management system 15 may as well be implemented in other types of vehicles or vessels, such as in busses, light-weight trucks, passenger cars, marine applications etc. The vehicle 1 is an electric vehicle, such as a full electric vehicle or a hybrid, comprising at least one electric machine 10 powered by the EST system 30, wherein in the example of FIG. 1, the EST system 30 comprises three EST devices 31, 32, 33, being e.g. batteries, supercapacitors or fuel cells. In the following, it is assumed that the EST system 30 is a battery system 30 and that the energy storage or transformation devices 31, 32, 33 are battery packs 31, 32, 33. The EST management system 15 is thus a battery management system 15 configured to manage the battery system 30 and e.g. connected and disconnect the battery packs 31, 32, 33 relative the electric machine 10. Moreover, the battery management system 15 comprises a control unit 17 arranged and configured for controlling the operation of the battery system 30. The vehicle 1 typically further comprises other parts of the powertrain such as transmission, drive shafts and wheels (not shown in detail). Each battery pack 31, 32, 33 typically comprises a plurality of series connected battery cells, or series connected battery cell blocks.

Figure 2:
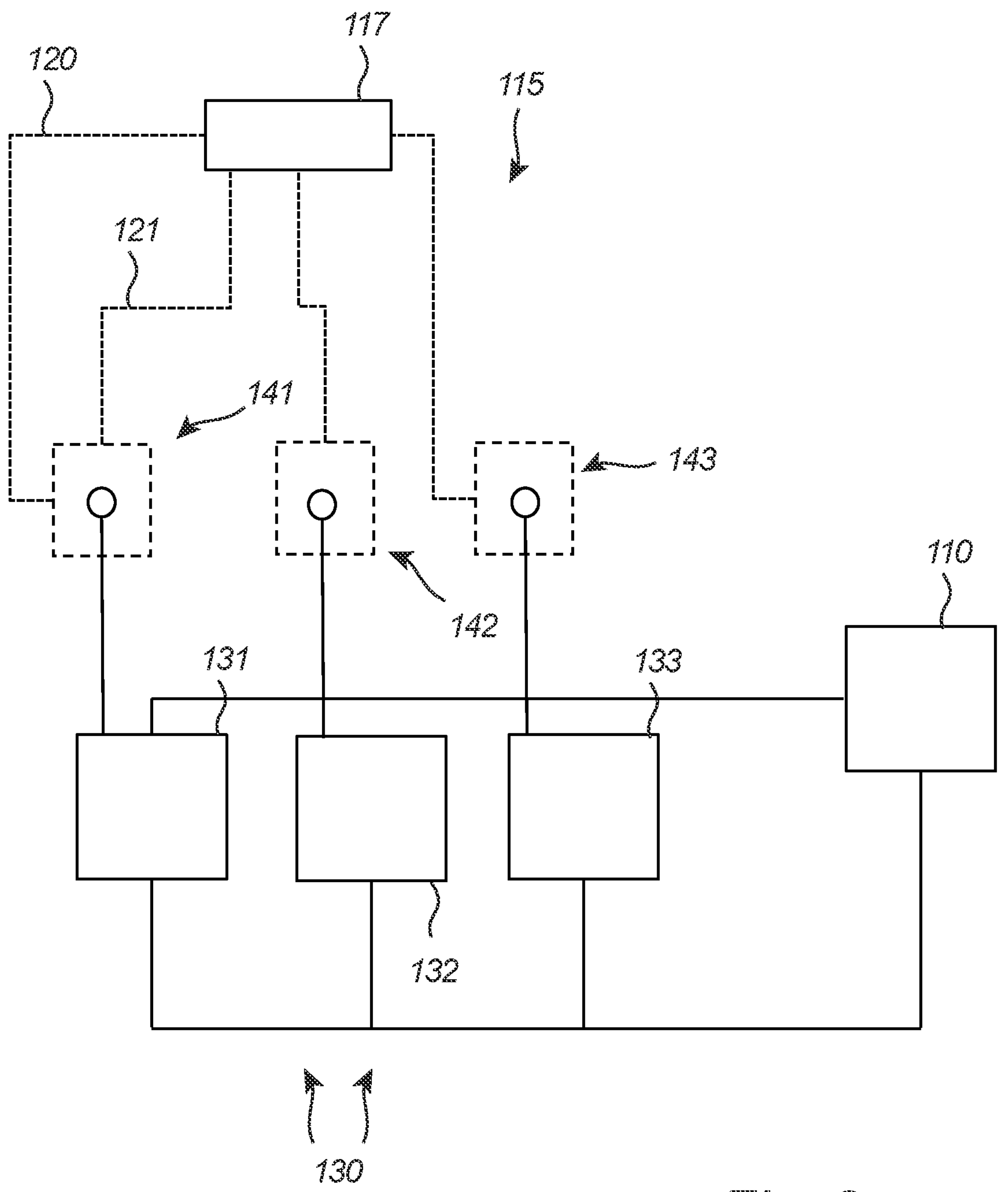
FIG. 2 is a schematic view of an energy storage or transformation system in the form of a battery system in accordance with an example embodiment of the invention.

FIG. 2 is a schematic view of a battery system 130 comprising a plurality of battery packs 131, 132, 133 arranged in parallel for powering a load 110, and a battery management system 115. The load 110 may be powered by the first, second and third battery packs 131, 132, 133 by means of contactors (not shown), i.e. by connecting the first, second and third battery packs 131, 132, 133 to the load 110. Correspondingly, the first, second and third battery packs 131, 132, 133 may be disconnected from the load 110 by means of the contactors. The embodiment shown in FIG. 2 may for example be implemented in the vehicle 1 of FIG. 1. Thus, the load 110 in FIG. 2 may be an electric machine.

The battery system 130 comprises a first battery pack 131, a second battery pack 132 and a third battery pack 133, but it should be noted that any number of battery packs may be included in the battery system 130. The battery management system 115 comprises a first sensor unit 141 configured to measure at least one quantity of the first battery pack 131, such as e.g. temperature, current and/or voltage, and comprises a second sensor unit 142 configured to measure at least one quantity of the second battery pack 132, such as e.g. temperature, current and/or voltage, and comprising a third sensor unit 143 configured to measure at least one quantity of the third battery pack 133, such as e.g. temperature, current and/or voltage. Thus, an associated sensor unit, here being the first, second and third sensor units 141, 142, 143 exist for each battery pack, here being the corresponding first, second and third battery packs 131, 132, 133. The first, second and third sensor units 141, 142, 143 are configured to provide EST condition data, here in the form of measured data (sensory measurement data of the at least one quantity).

The control unit 117, being e.g. an electronic control unit, of the EST management system 115 is configured to receive the EST condition data from the first, second and third sensor units 141, 142, 143 (thus, the control unit 117 may correspond to the previously described second electronic unit and each one of the first, second and third sensor units 141, 142, 143 may correspond to a respective first electronic unit). As will be described in further detail in FIGS. 3A-3C, the EST management system 115 is configured to transfer the EST condition data from each one of the first, second and third sensor units 141, 142, 143 by means of a first data transfer mode and a second transfer mode. For example, as can be seen in FIG. 2, the EST management system 115 is configured to transfer the EST condition data from the first sensor unit 141 to the control unit 117 via a first data transfer means 120, being e.g. a first communication bus 120, extending from the first sensor unit 141 to the control unit 117, and a second data transfer means 121, being e.g. a second communication bus 121, extending from the first sensor unit 141 to the control unit 117 in parallel to the first data transfer means 120. Thus, the EST condition data may be transferred from the first sensor unit 141 to the control unit 117 by means of a first transfer mode, i.e. the first data transfer means 120, and by means of a second data transfer mode, i.e. the second data transfer means 121. In other words, the EST management system 115 comprises a first communication bus 120 for transferring the EST condition data from the first sensor unit 141 by means of the first data transfer mode, and a second communication bus 121 for transferring the EST condition data from the first sensor unit 141 by means of the second data transfer mode, the second communication bus 121 being different to the first communication bus 120. The EST management system 115 is further configured to transfer the EST condition data from the second sensor unit 142 to the control unit 117, and is configured to transfer the EST condition data from the third sensor unit 143 to the control unit 117 via a respectively first and second data transfer modes, e.g. as described with reference to FIG. 3A-3C.

Figures 3A, 3B, 3C:
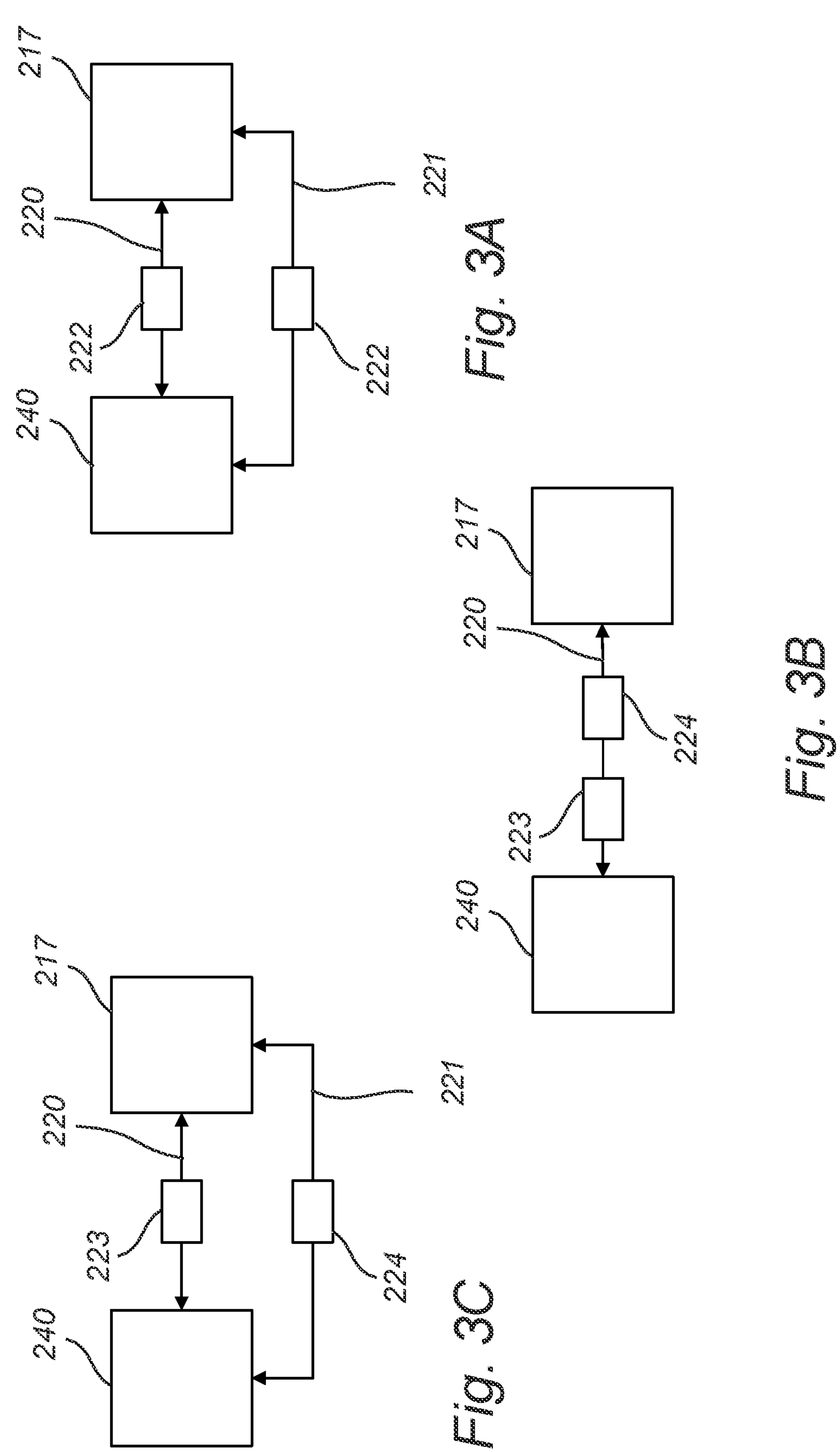
FIGS. 3A-3C are schematic views describing the transfer of EST condition data from the first electronic unit to the second electronic unit by means of first and second data transfer modes.

FIGS. 3A-3C shows a first electronic unit 240 in data communication with a second electronic unit 217. The first electronic unit 240 is configured to provide EST condition data, e.g. in the form of measured data or data regarding a calculation or estimation of a first internal state of the EST system. For example, the first electronic unit 240 comprises a sensor unit as e.g. either one of the first, second and third sensor units 141, 142, 143 of the embodiment in FIG. 2. The second electronic unit 217 is configured to receive the EST condition data from the first electronic unit 240, the second electronic unit 217 being a control unit as e.g. the control unit 117 of the embodiment in FIG. 2.

As shown in FIG. 3A, the data transfer between the first electronic unit 240 and the second electronic unit 217 is realised by a first communication bus 220 and a second communication bus 221, different to the first communication bus 220. Thus, the EST condition data, here referred to as being comprised in message 222, or data message 222, may be transferred from the first electronic unit 240 to the second electronic unit 217 by means of a first transfer mode, i.e. by the first communication bus 220, and by means of a second data transfer mode, i.e. by the second communication bus 221. As shown in FIG. 3A, the same EST condition data, or the same message 222, is transferred from the first electronic unit 240 to the second electronic unit 217 by the first and second communication buses 220, 221.

As shown in FIG. 3B, the data transfer between the first electronic unit 240 and the second electronic unit 217 is realised by a single communication bus 220, being e.g. the first communication bus 220. However, in FIG. 3B, the EST condition data is transferred from the first electronic unit 240 to the second electronic unit 217 as a first message 223 and a second message 224 different to the first message 223. Thus, the EST condition data is transferred from the first electronic unit 240 to the second electronic unit 217 by means of a first transfer mode, i.e. by the first message 223, and by means of a second data transfer mode, i.e. by the second message 224. The first and second messages 223, 224 may comprise EST condition data of the same type but transferred at different times (i.e. being separate messages with regards to the time of transfer), or may comprise EST condition data of different types. Thus, for the latter, the data representing the EST condition data in the second message 224 may e.g. be of a different type than the data representing the EST condition data in the first message 223. For example, the first message 223 may comprise the EST condition data in the unit or power, and the second message 224 may comprise the EST condition data in the units of current and voltage.

As shown in FIG. 3C, the embodiments of FIG. 3A and FIG. 3B are combined. Thus, the data transfer between the first electronic unit 240 and the second electronic unit 217 is realised by a first communication bus 220 and a second communication bus 221, different to the first communication bus 220 as well as that the EST condition data is transferred from the first electronic unit 240 to the second electronic unit 217 as a first message 223 and a second message 224 different to the first message 223. Thus, the EST condition data may be transferred from the first electronic unit 240 to the second electronic unit 217 by means of a first transfer mode, i.e. by the first communication bus 220 and the first message 223, and by means of a second data transfer mode, i.e. by the second communication bus 221 and the second message 224. As for the embodiment of FIG. 3B, the first and second messages 223, 224 may comprise EST condition data of the same type but transferred at different times (i.e. being separate messages with regards to the time of transfer), or may comprise EST condition data of different types.

A method for improving the availability of an EST system of a vehicle, such as e.g. the EST system in the form of a battery system 15, 115 of FIGS. 1-2 will now be described. The EST system comprises a first electronic unit configured to provide EST condition data and a second electronic unit configured to receive the EST condition data from the first electronic unit by means of a first data transfer mode, as for example described with reference to FIGS. 3A-3C.

In a first step S10, the EST condition data is transferred from the first electronic unit by means of a second data transfer mode. According to at least one example embodiment, (depending on the fault or error described below), the first step S10 comprises transferring the EST condition data from the first electronic unit by means of the first data transfer mode. As described with reference to FIGS. 3A-3C, the first and second data transfer modes are different. For example, the first data transfer mode comprises transferring the EST condition data via a first communication bus, and the second data transfer mode comprises transferring the EST condition data via a second communication bus being different to the first communication bus. Moreover, the first data transfer mode may comprise transferring the EST condition data via a first message, and the second data transfer mode may comprise transferring the EST condition data via a second message being different to the first message. The second message may be of a different type than the first message, or the data representing the EST condition data in the second message may be of a different type than the data representing the EST condition data in the first message. As described with reference to FIG. 3C, the first data transfer mode may comprise transferring the EST condition data via the first message and the first communication bus, and the second data transfer mode may comprise transferring the EST condition data via the second message and the second communication bus.

In a second step S20, a fault or error regarding the EST condition data in relation to the first data transfer mode is received. The second step S20 may comprise the step of identifying or detecting a fault or error regarding the EST condition data in relation to the first data transfer mode.

The first electronic unit may comprise a first sensor configured to provide measurement data as the EST condition data. Thus, the second step S20 may be based on a fault or error regarding the measurement data in relation to the first data transfer mode. Additionality or alternatively, the first electronic unit comprises a calculation unit configured to provide a calculation or estimation of a first internal state of the EST system as the EST condition data. Thus, the second step S20 may be based on a fault or error regarding the first internal state in relation to the first data transfer mode. The fault or error may origin from the EST condition data, e.g. the measurement data or the calculation of the first internal state, or may origin from the transfer of the EST condition data. According to at least one example embodiment, the fault or error is at least one of the following: transmission error of the EST condition data, repetition of the EST condition data, deletion of the EST condition data, corruption of the EST condition data, delay of the EST condition data and masquerade error of the EST condition data.

In a third step S30, it is determined whether or not an EST system criterium is achieved, the EST system criterium comprising at least that the EST condition data transferred by the first electronic unit by means of the second data transfer mode is received by the second electronic unit. The EST system criterium, or an EST system criteria comprising more than one EST system criterium, may further comprise that the fault or error regarding the EST condition data in relation to the first data transfer mode is expressive of an at least temporary lack of operability of the EST system.

In a fourth step S40, a vehicle situation which, in case of an at least temporary lack of operability of the EST system, belong to a predetermined group of vehicle situations defined as hazardous is identified. The hazardous vehicle situations may be defined as potentially harmful situations (e.g. corresponding to the ISO 26262 and HARA as previously described. According to an alternative example embodiment, the EST system criterium or EST system criteria comprises the identification of such potentially harmful situation or identification of such hazardous vehicle situation. The vehicle situation (or vehicle condition), in case of an at least temporary lack of operability of the EST system, may be defined as hazardous or leading to a potentially harmful situation if the expected result of the at least temporary lack of operability of the EST system is more hazardous than that of the fault or error regarding the EST condition data in relation to the first data transfer mode. Stated differently, and according to at least one example embodiment, the identified vehicle situation belonging to the predetermined group of vehicle situations defined as hazardous has a predetermined vehicle risk level, and the received fault or error regarding the EST condition data in relation to the first data transfer mode has a predetermined EST system risk level, wherein the step of operating the EST system despite the fault or error and using the EST condition data transferred by means of the second data transfer mode is performed in response to that the risk level of the identified vehicle situation is higher than the risk level of the EST system.

The predetermined group of vehicle situations defined as hazardous may e.g. comprise vehicle situations potentially resulting in personal injuries, as previously described. The identification of such vehicle situation may be carried out utilizing preview information of the vehicle. The preview information may thus be used to predict an upcoming vehicle situation. The preview information may e.g. include map data, and e.g. comprise predicted road conditions and predicted road events. According to at least one example embodiment, the preview information comprises road topography and/or current traffic conditions. The preview information may comprise predicted road events such as current traffic conditions (e.g. expected traffic jams) and upcoming crossings, train crossings, parking lots, traffic lights or the like. It should be noted that the preview information is related to a future, expected or predicted situation of the vehicle, typically associated with an associated operation of the vehicle. The preview information is expected to occur in the near future, e.g. in 1 s to 15 min, or in 10 s to 15 min, or in 1 min to 15 min.

In a fifth step S50, and in response of at least achieving the EST system criterium in the third step S30, the EST system is operated despite the fault or error and using the EST condition data transferred by means of the second data transfer mode. According to at least one example embodiment, the fifth step S50 is carried out in response to the fourth step S40, i.e. the identification of a vehicle situation which, in case of an at least temporary lack of operability of the EST system, belongs to a predetermined group of vehicle situations defined as hazardous.

Figure 4:
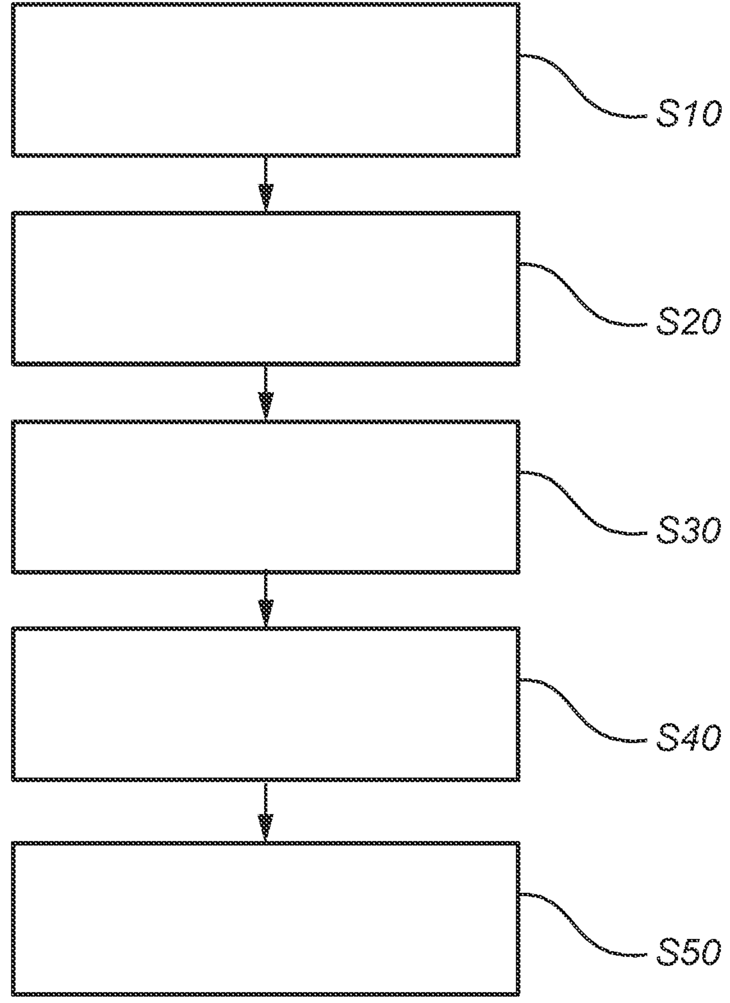
FIG. 4 is a flowchart illustrating the steps of a method in accordance with example embodiments of the invention.

According to at least one example embodiment, the EST system comprises an EST management system having an electronic control unit being configured to perform the method as described with reference to FIG. 4. The EST management system may e.g. be a battery management system. The method as described with reference to FIG. 4 may be implemented in a computer program. Thus, the computer program may comprise program code means for performing the method as described with reference to FIG. 4, when the program is run on a computer. Alternatively the method as described with reference to FIG. 4 may be implemented in a computer readable medium carrying a computer program comprising program code means for performing the method as described with reference to FIG. 4, when the computer program is run on a computer.

Turning back to FIGS. 1 and 2, the control unit 17, 117 may be configured to perform the method as described with reference to FIG. 4. That is, the control unit is, at least, configured to

- receive a fault or error regarding the EST condition data in relation to the first data transfer mode,
- determine whether or not an EST system criterium is achieved, the EST system criterium comprising at least that the EST condition data transferred by the first electronic unit by means of the second data transfer mode is received by the second electronic unit,
- in response of achieving the EST system criterium, operate the EST system despite the fault or error and using the EST condition data transferred by means of the second data transfer mode.

The control unit 17, 117 may be further configured to identify a vehicle situation which, in case of an at least temporary lack of operability of the EST system, belong to a predetermined group of vehicle situations defined as hazardous. The control unit 17, 117 may e.g. have access to such vehicle situations by means of a look-up table. Moreover, the identification of such vehicle situation may be carried out utilizing preview information of the vehicle, such as predicted vehicle situations based on e.g. map data, as previously described.

The control unit 17, 117 may be further configured to in response to identifying the vehicle situation belonging to the predetermined group of vehicle situations defined as hazardous, as well as in response of achieving the EST system criterium, operating the EST system despite the fault or error and using the EST condition data transferred by means of the second data transfer mode.

It should be noted that the naming of the steps not necessarily, but might according to at least one example embodiment, relate to the order in which the steps are carried out. Thus, the order of the steps may be different than that explained here, and the control unit 17, 117 of FIGS. 1-2 may be configured to carry out one or several of the steps. Moreover, one or more of the steps may be combined and carried out simultaneously.

It is to be understood that the present invention is not limited to the embodiments described above and illustrated in the drawings; rather, the skilled person will recognize that many changes and modifications may be made within the scope of the appended claims.

Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any standard (such as ISO 26262) mentioned in the present application are to be based on instructions valid on the date of priority of the present application.

The invention claimed is:

1. A computer implemented method for improving the availability of an energy storage or transformation ("EST") system of a vehicle, the EST system comprising a first electronic processor comprising a first sensor configured to provide measurement data as EST condition data, the EST system further comprising a second electronic processor being a control processor, the method comprising:

transferring the EST condition data from the first electronic processor to the second electronic processor by means of a first data transfer mode, transferring the EST condition data from the first electronic processor to the second electronic processor by means of a second data transfer mode, wherein the EST condition data transferred by both the first and second data transfer mode comprises the measurement data from the first sensor, and wherein the measurement data from the first sensor is directly measured by the first sensor, receiving a fault or error regarding the EST condition data in relation to the first data transfer mode, wherein the fault or error corresponds to a fault or error in the measurement data itself, wherein the fault or error in the measurement data further comprises a data communication error in the transfer of the EST condition data by means of the first data transfer mode, identifying a vehicle situation which, in case of an at least temporary lack of operability of the EST system, belongs to a predetermined group of vehicle situations defined as hazardous, wherein the identified vehicle situation belonging to the predetermined group of vehicle situations defined as hazardous has a predetermined vehicle risk level, and wherein the received fault or error regarding the EST condition data in relation to the first data transfer mode has a predetermined EST system risk level, determining whether or not an EST system criteria is achieved, the EST system criteria comprising at least that the EST condition data transferred by the first electronic processor by means of the second data transfer mode is received by the second electronic processor, in response of achieving the EST system criteria, operating the EST system despite the fault or error and using the EST condition data transferred by means of the second data transfer mode, wherein operating the EST system despite the fault or error and using the EST condition data transferred by means of the second data transfer mode is carried out in response to identifying the vehicle situation belonging to the predetermined group of vehicle situations defined as hazardous, and wherein operating the EST system despite the fault or error and using the EST condition data transferred by means of the second data transfer mode is performed in response to the risk level of the identified vehicle situation being higher than the risk level of the EST system.

2. The method according to claim 1, wherein the first data transfer mode comprises transferring the EST condition data via a first communication bus, and the second data transfer mode comprises transferring the EST condition data via a second communication bus being different to the first communication bus.

3. The method according to claim 1, wherein the first data transfer mode comprises transferring the EST condition data via a first message, and the second data transfer mode comprises transferring the EST condition data via a second message being different to the first message.

4. The method according to claim 3, wherein the second message is of a different type than the first message, or wherein the data representing the EST condition data in the second message is of a different type than the data representing the EST condition data in the first message.

5. The method according to claim 2, wherein the first data transfer mode comprises transferring the EST condition data via the first message and the first communication bus, and the second data transfer mode comprises transferring the EST condition data via the second message and the second communication bus.

6. The method according to claim 1, wherein the EST system criteria comprises that the fault or error regarding the EST condition data in relation to the first data transfer mode indicates an at least temporary lack of operability of the EST system.

7. The method according to claim 1, wherein the fault or error regarding the EST condition data in relation to the first data transfer mode is at least one of the following: transmission error of the EST condition data, repetition of the EST condition data, deletion of the EST condition data, corruption of the EST condition data, delay of the EST condition data and masquerade error of the EST condition data.

8. An EST management system comprising an electronic control processor being configured to perform:

transferring the EST condition data from the first electronic processor to the second electronic processor by means of a first data transfer mode, transferring the EST condition data from the first electronic processor to the second electronic processor by means of a second data transfer mode, wherein the EST condition data transferred by both the first and second data transfer mode comprises the measurement data from the first sensor, and wherein the measurement data from the first sensor is directly measured by the first sensor, receiving a fault or error regarding the EST condition data in relation to the first data transfer mode, wherein the fault or error corresponds to a fault or error in the measurement data itself, wherein the fault or error in the measurement data further comprises a data communication error in the transfer of the EST condition data by means of the first data transfer mode, identifying a vehicle situation which, in case of an at least temporary lack of operability of the EST system, belongs to a predetermined group of vehicle situations defined as hazardous, wherein the identified vehicle situation belonging to the predetermined group of vehicle situations defined as hazardous has a predetermined vehicle risk level, and wherein the received fault or error regarding the EST condition data in relation to the first data transfer mode has a predetermined EST system risk level, determining whether or not an EST system criteria is achieved, the EST system criteria comprising at least that the EST condition data transferred by the first electronic processor by means of the second data transfer mode is received by the second electronic processor, in response of achieving the EST system criteria, operating the EST system despite the fault or error and using the EST condition data transferred by means of the second data transfer mode, wherein operating the EST system despite the fault or error and using the EST condition data transferred by means of the second data transfer mode is carried out in response to identifying the vehicle situation belonging to the predetermined group of vehicle situations defined as hazardous, and wherein operating the EST system despite the fault or error and using the EST condition data transferred by means of the second data transfer mode is performed in response to the risk level of the identified vehicle situation being higher than the risk level of the EST system.

9. An EST system of a vehicle comprising an EST management system according to claim 8.

10. The EST system according to claim 9, comprising the first electronic processor configured to provide EST condition data, wherein the electronic control processor of the EST management system is configured to receive the EST condition data from the first electronic processor by means of a first data transfer mode, wherein the EST system comprises a first communication bus for transferring the EST condition data by means of the first data transfer mode, and a second communication bus for transferring the EST condition data by means of the second data transfer mode, the second communication bus being different to the first communication bus.

11. A vehicle comprising an EST system including an electronic control processor being configured to perform:

transferring the EST condition data from the first electronic processor to the second electronic processor by means of a first data transfer mode, transferring the EST condition data from the first electronic processor to the second electronic processor by means of a second data transfer mode, wherein the EST condition data transferred by both the first and second data transfer mode comprises the measurement data from the first sensor, and wherein the measurement data from the first sensor is directly measured by the first sensor, receiving a fault or error regarding the EST condition data in relation to the first data transfer mode, wherein the fault or error corresponds to a fault or error in the measurement data itself, wherein the fault or error in the measurement data further comprises a data communication error in the transfer of the EST condition data by means of the first data transfer mode, identifying a vehicle situation which, in case of an at least temporary lack of operability of the EST system, belongs to a predetermined group of vehicle situations defined as hazardous, wherein the identified vehicle situation belonging to the predetermined group of vehicle situations defined as hazardous has a predetermined vehicle risk level, and wherein the received fault or error regarding the EST condition data in relation to the first data transfer mode has a predetermined EST system risk level, determining whether or not an EST system criteria is achieved, the EST system criteria comprising at least that the EST condition data transferred by the first electronic processor by means of the second data transfer mode is received by the second electronic processor, in response of achieving the EST system criteria, operating the EST system despite the fault or error and using the EST condition data transferred by means of the second data transfer mode, wherein operating the EST system despite the fault or error and using the EST condition data transferred by means of the second data transfer mode is carried out in response to identifying the vehicle situation belonging to the predetermined group of vehicle situations defined as hazardous, and wherein operating the EST system despite the fault or error and using the EST condition data transferred by means of the second data transfer mode is performed in response to the risk level of the identified vehicle situation being higher than the risk level of the EST system.

12. A computer implemented method for improving the availability of an energy storage or transformation ("EST") system of a vehicle, the EST system comprising a first electronic processor comprising a first sensor configured to provide measurement data as EST condition data, the EST system further comprising a second electronic processor being a control processor, the method comprising:

transferring the EST condition data from the first electronic processor to the second electronic processor by means of a first data transfer mode, transferring the EST condition data from the first electronic processor to the second electronic processor by means of a second data transfer mode, wherein the EST condition data transferred by both the first and second data transfer mode comprises the measurement data from the first sensor, and wherein the measurement data from the first sensor is directly measured by the first sensor, receiving a fault or error regarding the EST condition data in relation to the first data transfer mode, wherein the fault or error corresponds to a fault or error in the measurement data, wherein the fault or error in the measurement data further comprises at least one of the following: transmission error of the EST condition data, repetition of the EST condition data, deletion of the EST condition data, corruption of the EST condition data, delay of the EST condition data or masquerade error of the EST condition data, identifying a vehicle situation which, in case of an at least temporary lack of operability of the EST system, belongs to a predetermined group of vehicle situations defined as hazardous, wherein the identified vehicle situation belonging to the predetermined group of vehicle situations defined as hazardous has a predetermined vehicle risk level, and wherein the received fault or error regarding the EST condition data in relation to the first data transfer mode has a predetermined EST system risk level, determining whether or not an EST system criteria is achieved, the EST system criteria comprising at least that the EST condition data transferred by the first electronic processor by means of the second data transfer mode is received by the second electronic processor, in response of achieving the EST system criteria, operating the EST system despite the fault or error and using the EST condition data transferred by means of the second data transfer mode, wherein operating the EST system despite the fault or error and using the EST condition data transferred by means of the second data transfer mode is carried out in response to identifying the vehicle situation belonging to the predetermined group of vehicle situations defined as hazardous, and wherein operating the EST system despite the fault or error and using the EST condition data transferred by means of the second data transfer mode is performed in response to the risk level of the identified vehicle situation being higher than the risk level of the EST system.

13. A computer implemented method for improving the availability of an energy storage or transformation ("EST") system of a vehicle, the EST system comprising a first electronic processor comprising a calculation processor configured to provide a calculation of a first internal state of the EST system as condition data, the first internal state including at least one of State-of-Charge (SoC), State-of-Power (SoP) or State-of-Energy (SoE) of the EST system, the EST system further comprising a second electronic processor being a control processor, the method comprising:

transferring the EST condition data from the first electronic processor to the second electronic processor by means of a first data transfer mode, transferring the EST condition data from the first electronic processor to the second electronic processor by means of a second data transfer mode, wherein the EST condition data transferred by both the first and second data transfer mode comprises the first internal state from the calculation processor, receiving a fault or error regarding the EST condition data in relation to the first data transfer mode, wherein the fault or error corresponds to a fault or error in the first internal state, identifying a vehicle situation which, in case of an at least temporary lack of operability of the EST system, belongs to a predetermined group of vehicle situations defined as hazardous, wherein the identified vehicle situation belonging to the predetermined group of vehicle situations defined as hazardous has a predetermined vehicle risk level, and wherein the received fault or error regarding the EST condition data in relation to the first data transfer mode has a predetermined EST system risk level, determining whether or not an EST system criteria is achieved, the EST system criteria comprising at least that the EST condition data transferred by the first electronic processor by means of the second data transfer mode is received by the second electronic processor, in response of achieving the EST system criteria, operating the EST system despite the fault or error and using the EST condition data transferred by means of the second data transfer mode, wherein operating the EST system despite the fault or error and using the EST condition data transferred by means of the second data transfer mode is carried out in response to identifying the vehicle situation belonging to the predetermined group of vehicle situations defined as hazardous, and wherein operating the EST system despite the fault or error and using the EST condition data transferred by means of the second data transfer mode is performed in response to the risk level of the identified vehicle situation being higher than the risk level of the EST system.

14. The computer implemented method of claim 13, wherein the fault or error in the first internal state comprises a fault or error in the calculation or estimation of the first internal state, or the data transfer thereof by means of the first data transfer mode.

* * * * *